United States Patent [19]
Compagnucci

[11] Patent Number: 5,134,972
[45] Date of Patent: Aug. 4, 1992

[54] VENTILATED PET LITTER BOX

[76] Inventor: Charles Compagnucci, 230 Foxboro Dr., Glassboro, N.J. 08028

[21] Appl. No.: 793,792
[22] Filed: Nov. 18, 1991
[51] Int. Cl.⁵ .................... A01K 1/00; A01K 29/00
[52] U.S. Cl. ........................ 119/165; 119/17
[58] Field of Search ............... 119/165, 163, 161, 19, 119/15, 17

[56] References Cited

U.S. PATENT DOCUMENTS 3,428,026  2/1969  Sohmers et al. ............... 119/17
4,095,559  6/1978  Griffith ............................ 119/165
4,546,727  10/1985 Anderson ......................... 119/165
4,989,545  2/1991  Sheaffer et al. ................. 119/17

Primary Examiner—John G. Weiss
Attorney, Agent, or Firm—Abdallah & Muckelroy

[57] ABSTRACT

A ventilated pet litter box for use in a closed space includes a litter receptacle, a receptacle cover, a vibration-damped exhaust fan communicating with the receptacle cover and a wall orifice attachment, and a wall orifice attachment to discharge ventilating forced-air to outside of the closed space.

6 Claims, 1 Drawing Sheet

VENTILATED PET LITTER BOX

BACKGROUND OF THE INVENTION

The present invention generally relates to pet litter boxes. More specifically, the present invention relates to forced-air ventilated pet litter boxes suitable for use in closed spaces.

U.S. Pat. No. 4,095,559 to Griffith discloses a ventilated litter box generally comprising a litter tray, a partial cover for the litter tray having a skirt extending from the cover to the litter tray, the skirt having a plurality of openings formed therein, an exhaust vent formed in the cover, and an exhaust fan connected to the exhaust vent by means of a length of flexible hose. The exhaust fan is mounted to a baffle plate in a window frame to withdraw air from the litter box to outside the window. U.S. Pat. No. 4,546,727 to Andersen discloses a litter box tray having aperatures through which streams of air pass through litter by means of an exhaust fan attached to the litter box tray. None of the prior art references known to the Applicant discloses a ventilated pet litter box having a quiet, self-contained motorized forced-air exhaust system. It is important that a motorized ventilating system in a pet litter box be quiet and substantially vibration free to encourage use of the litter box by a pet.

SUMMARY OF THE INVENTION

The ventilated pet litter box of the present invention includes a litter receptacle, a litter receptacle cover having a first opening formed in a side wall of the receptacle cover and a second opening formed in a top wall of the receptacle cover, air filtering means attached in selectively removable engagement to the top wall of the receptacle cover adjacent the second opening, a selectively removable exhaust fan housing disposed on the top wall of receptacle cover adjacent the second opening, an exhaust fan disposed in the interior of fan housing and attached thereto by vibration damping means, an exhaust duct attached to the exhaust fan and communicating with the exterior of fan housing, a length of flexible tubing attached to the exhaust duct, wall orifice attachment means connected to the length of tubing and receivable in a wall orifice, and a vent hood attachable to an outside portion of a wall adjacent to the wall orifice and including a flap damper.

An object of the present invention is to provide a pet litter box that can be placed at any location within a closed space having means to exhaust litter odors to the outside of the closed space.

Another object of this invention is to provide a pet litter box having a self-contained ventilation system.

A further object of the present invention is to provide a ventilated pet litter box having ventilation system noise and vibration dampening means to prevent pet trauma.

It is also an object of this invention to provide a pet litter box that continually drys pet litter to extend the useful life of the litter between changes.

These and other objects and advantages of the present invention will be apparent to those skilled in the art from the following descriptioning of a preferred embodiment, claims and appended drawings.

DESCRIPTION OF A PREFERRED EMBODIMENT

Figure 1:
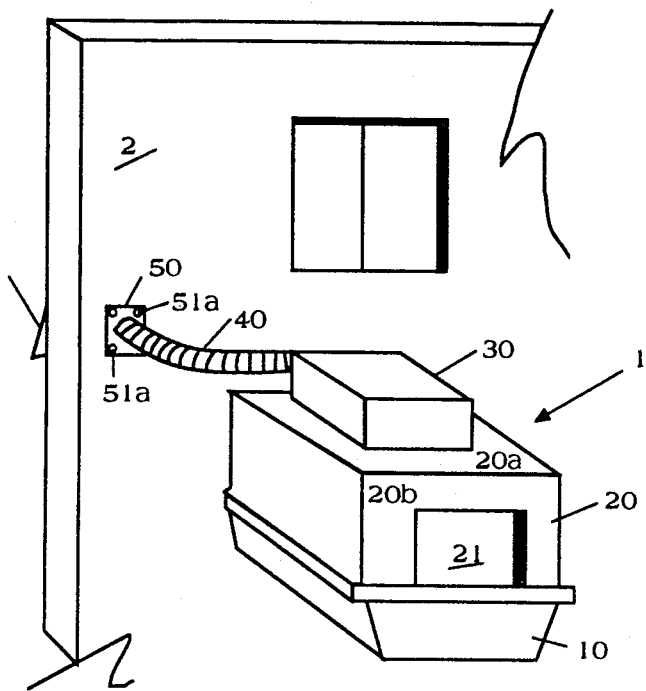
FIG. 1 is a perspective view of the ventilated pet litter box of the present invention.

FIG. 1 illustrates in a perspective view the ventilated pet litter box 1 of the present invention. Litter box 1 generally includes a litter receptacle 10, a receptacle cover 20, a motorized forced-air exhaust system 30 disposed on a top wall 20a of receptacle cover 20, a length of flexible hose tubing 40 connected at one end to the exhaust system 30, wall orifice attachment means 50 connected to the opposite end of tubing 40 and receivable in a wall 2, and an air discharge vent 60 attached to the wall orifice attachment means 50.

Litter receptacle 10 receives pet litter on the floor thereof as known in the art. Receptacle cover 20 fits on the top portion of receptacle 10 and includes a first opening 21 formed in a side wall 20b of receptacle cover 20 to permit a pet to enter and exit the litter box 1 and further includes a second opening 22 formed in the top wall 20a of receptacle cover 20 communicating with the exhaust system 30 for ventilation of the litter box 1 as hereinafter described in greater detail.

Figure 2:
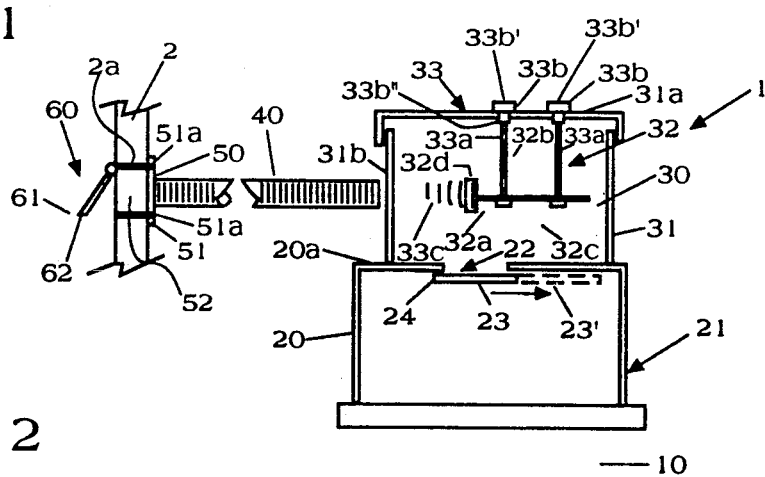
FIG. 2 is a partially cross-sectioned elevational view of the present invention.

As can be seen in the partially cross-sectioned view of the litter box 1 illustrated in FIG. 2, an air filter 23 having the flat, framed construction known in the prior art is slidably received by a filter holder 24 fixedly attached to the top wall 20a of receptacle cover 20 adjacent second opening 22. Filter holder 24 is preferably formed from ⅛" aluminium channel sections disposed adjacent three sides of second opening 22. Filter 23 can thereby be slid from filter holder 24 to the position shown by the phantom lines and indicated by the numeral 23' for removal and/or cleaning.

Forced-air exhaust system 30 includes a exhaust fan housing 31 having a removable fan housing top 31a for access to the interior of fan housing 31. Fan housing 31 is fixedly attached to the top wall 20a of receptacle cover 20 over the second opening 22. A motorized exhaust fan 32 which includes fan blade housing 32a and a fan motor 32b is disposed within the interior of fan housing 31. Fan 32 is preferably a centrifugal "squirrel cage" type exhaust fan with a 4"-diameter wheel having an air exchange capacity of 20 cfm at ¼" static pressure. Fan motor 32b is preferably a 1/260 HP, 110 volt, one-phase, 60-cycle motor and may be provided with a variable speed switch and a timer switch. The fan air inlet 32c of fan 32 is downwardly disposed toward second opening 22, and the fan air outlet 32d is disposed toward a side wall of fan housing 31. To reduce vibration of litter box 1 caused by the operation of fan 32, which can frighten a pet and discourage use of litter box 1, fan 32 is suspended within the interior of fan housing 31 by vibration damping means 33. Vibration damping means 33 includes (1) a plurality of rod attached at one end to the fan blade housing 32a and at the opposite end to the fan housing top 31a by vibration isolator connection means 33b, and (2) a flexible canvas connector 33c attached at one end thereof to the fan air outlet 32d and at the opposite end thereof to a fan housing discharge duct 31b formed in a wall of said fan housing 31. Vibration isolator connection means 33b preferably comprises in combination a ⅜"-diameter nut 33b' and a rubber in-shear vibration isolator 33b'''. Vibration isolator 33b'' is received within the fan housing top 31a and secured in place by nut 33b'. Hanger rods 33a extend through the vibration isolators 33b'' and are fixedly attached thereto.

A length of flexible hose tubing 40 is attached to the fan housing discharge duct 31b at one end and to wall orifice attachment means 50 at the opposite end. Wall orifice attachment means 50 comprises a wall bearing plate 51 and a length of piping 52. Wall bearing plate 51 includes screw holes 51a for fixed attachment of bearing plate 51 to an inside portion of a wall 2. Piping 52 is receivable within an opening 2a extending transversely through wall 2. An air discharge vent 60 is fixedly attached to an outside portion of wall 2 adjacent the opening 2a in wall 2. Air discharge vent 60 preferably includes a vent hood 61 and a flap damper 62 pivotally attached adjacent opening 2a.

The pet litter box 1 of the present invention provides means to ventilate used pet litter to remove odors therefrom and is particularly useful when the pet litter box 1 is placed in a closed room or used by more than one pet. Utilizing the ventilated litter box 1 of the present invention odors can be discharge outdoors without having to open a window, door etc. This is particularly handy during cold winter months and other inclement weather. The ventilated pet litter box 1 of the present invention is also useful in extending the life of pet litter. The vibration damping means 33 permits the force-air exhaust system 30 to be run constantly. The constant ventilation of pet litter keeps it dry. Therefore the life of pet litter between changes is extended. The maintenance of dry litter and removal of litter odor permits the use of litter for longer periods thereby allows pet owners greater freedom.

Various changes, additions and modifications may be made to the ventilated pet litter box 1 of the present disclosure without departing from the spirit and scope of this disclosure. Such changes, additions and modifications within a fair reading of the appended claims are intended as part of the present invention.

Therefore, in view of the foregoing I claim:

1. A ventilated, self-contained pet litter box comprising
   a litter receptacle;
   a receptacle cover removably attached to said litter receptacle;
   a forced-air exhaust system communicating with an interior portion on said receptacle cover, said forced-air exhaust system comprising a fan housing and an exhaust fan, said exhaust fan being suspended within an interior portion of said fan housing and attached to said an housing by vibration damping connecting means, said vibration damping connection means comprising
   at least one hanger rod attached at one end to said exhaust fan and to a top portion of said fan housing at the opposite end of said hanger rod, said hanger rod being attached to said fan housing by vibration isolator connecting means, and
   flexible connecting means attached at one end to a discharge duct of said exhaust fan and at the opposite end to a fan housing discharge duct.

2. A ventilated, self-contained pet litter box comprising
   a litter receptacle;
   a litter receptacle cover having a first opening formed in a side wall of the receptacle cover and a second opening formed in a top wall of the receptacle cover;
   air filtering means attached in selectively removable engagement to the top wall of receptacle cover adjacent to the second opening;
   an exhaust fan housing attached to the top wall of receptacle cover adjacent the second opening;
   an exhaust fan disposed in the interior of fan housing and attached to the fan housing by vibration damping connecting means;
   an exhaust duct connected to the exhaust fan and communicating with the exterior of fan housing;
   a length of flexible hose tubing attached to the exhaust duct at one end;
   wall orifice attachment means connected to the length of tubing and receivable in a wall orifice; and
   an air discharge vent attached to the wall orifice opposite the wall orifice attachment means.

3. A ventilated, self-contained pet litter box as in claim 2, wherein said air filtering means comprises an air filter slidably receivable in an air filter holder disposed in receptacle cover about the periphery of second opening.

4. A ventilated, self-contained pet litter box as in claim 2 wherein said vibration damping means comprises at least one hanger rod attached at a first end to the top wall of said receptacle cover by means of a threaded fastener engaging said first end of hanger rod and a rubber, in-shear vibration isolator disposed adjacent to said top wall of receptacle cover, said hanger rod being attached at a second end to said exhaust fan, said vibration damping means further comprising a flexible connector disposed between an exhaust port of said exhaust fan and said exhaust duct.

5. A ventilated, self-contained pet litter box as in claim 2 wherein said air discharge vent includes a vent hood and a flap damper disposed adjacent said wall orifice.

6. A ventilated, self-contained pet litter box comprising
   a litter receptacle;
   a litter receptacle cover having a first opening formed in a side wall of the receptacle cover and a second opening formed in a top wall of the receptacle cover;
   air filtering means attached in selectively removable engagement to the top wall of receptacle cover adjacent to the second opening comprising an air filter slidably receivable in an air filter holder disposed in receptacle cover about the periphery of second opening;
   an exhaust fan housing attached to the top wall of receptacle cover adjacent the second opening;
   an exhaust fan disposed in the interior of fan housing and attached to the fan housing by vibration damping connecting means, said vibration damping means comprising at least one hanger rod attached at a first end to the top wall of said receptacle cover by means of a threaded fastener engaging said first end of hanger rod and a rubber, in-shear vibration isolator disposed adjacent to said top wall of receptacle cover, said hanger rod being attached at a second end to said exhaust fan, said vibration damping means further comprising a flexible connector disposed between an exhaust port of said exhaust fan and said exhaust duct;

an exhaust duct connected to the exhaust fan and communicating with the exterior of fan housing;

a length of flexible hose tubing attached to the exhaust duct at one end;

wall orifice attachment means connected to the length of tubing and receivable in a wall orifice; and an air discharge vent attached to the wall orifice opposite the wall orifice attachment means, said air discharge vent including a vent hood and a flap damper disposed adjacent said wall orifice.

* * * * *